United States Patent [19]

Nigorikawa et al.

[11] Patent Number: 4,668,425
[45] Date of Patent: May 26, 1987

[54] NOVEL LIQUID CRYSTAL COMPOUND

[75] Inventors: Kazunori Nigorikawa; Kisei Kitano, both of Yokohama; Shigeru Sugimori, Fujisawa; Tetsuya Ogawa, Yokohama, all of Japan

[73] Assignee: Chisso Corporation, Osaka, Japan

[21] Appl. No.: 868,728

[22] Filed: May 30, 1986

[30] Foreign Application Priority Data

Jun. 5, 1985 [JP] Japan ................... 60-121894

[51] Int. Cl.⁴ ............ G02F 1/13; C09K 19/34; C07D 401/04; C07D 213/53; C07D 239/02
[52] U.S. Cl. ............ 252/299.61; 252/299.5; 350/350 R; 350/350 S; 544/319; 544/333; 544/335; 546/275; 546/276
[58] Field of Search ............ 544/319, 333, 335; 546/275, 276; 252/299.61, 299.5; 350/350 S, 350 R

[56] References Cited

U.S. PATENT DOCUMENTS

| | | | |
|---|---|---|---|
| 4,062,798 | 12/1977 | Boller et al. | 252/299.61 |
| 4,510,069 | 4/1985 | Eidenschink et al. | 252/299.61 |
| 4,512,636 | 4/1985 | Andrews et al. | 252/299.61 |
| 4,565,425 | 1/1986 | Petrzilka et al. | 252/299.61 |
| 4,609,485 | 9/1986 | Kitano et al. | 252/299.61 |

FOREIGN PATENT DOCUMENTS

| | | | |
|---|---|---|---|
| 84194 | 7/1983 | European Pat. Off. | 252/299.61 |
| 0097033 | 12/1983 | European Pat. Off. | 252/299.61 |
| 104011 | 3/1984 | European Pat. Off. | 252/299.61 |
| 149238 | 7/1985 | European Pat. Off. | 252/299.61 |
| 149208 | 7/1985 | European Pat. Off. | 252/299.61 |
| 3315295 | 10/1984 | Fed. Rep. of Germany | 252/299.61 |
| 3404116 | 8/1985 | Fed. Rep. of Germany | 252/299.61 |
| 3411571 | 10/1985 | Fed. Rep. of Germany | 252/299.61 |
| 60-54371 | 3/1985 | Japan | 252/299.61 |
| 60-149564 | 8/1985 | Japan | 252/299.61 |
| 61-24571 | 2/1986 | Japan | 252/299.61 |
| 85/04874 | 11/1985 | PCT Int'l Appl. | 252/299.63 |
| 2092169 | 8/1982 | United Kingdom | 252/299.61 |
| 2121406 | 12/1983 | United Kingdom | 252/299.63 |
| 2161808 | 1/1986 | United Kingdom | 252/299.61 |
| 1063100 | 6/1985 | U.S.S.R. | 252/299.61 |

OTHER PUBLICATIONS

Nash, J. A., et al., Mol Cryst. Liq. Cryst., vol. 25, pp. 299–321 (1974).
Karamysheva, L. A., et al., Mol. Cryst. Liq. Cryst., vol. 67, pp. 241–252 (1981).
Pavluchemko, A. I., et al., Advances Liq. Cryst. Res. & Appl., Bata, L., Ed., pp. 1007–1013 (1980).

Primary Examiner—Teddy S. Gron
Attorney, Agent, or Firm—Leydig, Voit & Mayer

[57] ABSTRACT

A novel liquid crystal compound which is superior in compatibility with other liquid crystal compounds or liquid crystal compositions, chemically stable, and when added to liquid crystal compositions, can raise the clearing point thereof almost without increasing the viscosity and enhance Δε and Δn thereof, and a liquid crystal composition containing the same are provided, which compound is expressed by the formula

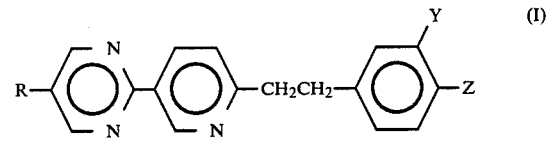

(I)

wherein R represents an alkyl group or an alkoxy group each of 1 to 10 carbon atoms; Y represents F, Cl or H; and Z represents F, Cl, cyano group or an alkyl group or an alkoxy group each of 1 to 10 carbon atoms.

6 Claims, No Drawings

NOVEL LIQUID CRYSTAL COMPOUND

BACKGROUND OF THE INVENTION

This invention relates to a novel liquid crystal compound and a liquid crystal composition containing the same.

Liquid crystal display elements utilize the optical anisotropy and the dielectric anisotropy of liquid crystal substances, and are classified into various modes such as those of TN type (twisted nematic type), DS type (dynamic scattering type), guest-host type, DAP type, etc., depending on the display mode of the elements; thus the properties of liquid crystal substances may be varied to render them suitable to their respective uses. However, many of liquid crystal substances have been required in common to be stable to moisture, air, heat, light, etc. and also those which exhibit liquid crystal phases in a temperature range as broad as possible around room temperature have been desired. At present, however, there is no single substance which satisfies such conditions; hence liquid crystal compositions obtained by blending several kinds of liquid crystal compounds or mixtures thereof with non-crystal compounds have been used.

SUMMARY OF THE INVENTION

The object of the present invention is to provide a novel liquid crystal compound which, when added to liquid crystal substance(s), can improve some characteristics required for the above liquid crystal compositions.

The present invention is a first aspect resides in (1) A novel liquid crystal compound expressed by the formula (I)

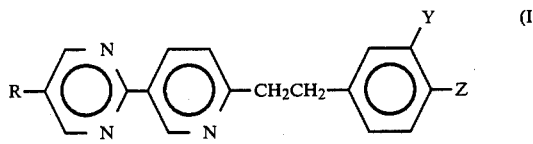

wherein R represents an alkyl group or an alkoxy group each of 1 to 10 carbon atoms; Y represents F, Cl or H; and Z represents F, Cl, cyano group or an alkyl group or an alkoxy group each of 1 to 10 carbon atoms.

The above present invention in a first aspect has the following embodiments (2) to (5) shown below:

(2) A 2-(β-substituted ethyl)-5-substituted pyridine according to the above paragraph (1) wherein R represents an alkyl group or an alkoxy group each of 1 to 10 carbon atoms; Y represents H; and Z represents F, Cl or cyano group, in said formula (I).

(3) A 2-(β-substituted ethyl)-5-substituted pyridine according to the above paragraph (1) wherein R represents an alkyl group or an alkoxy group each of 1 to 10 carbon atoms; Y represents F or Cl; and Z represents, F, Cl or cyano group, in said formula (I).

(4) A 2-(β-substituted ethyl)-5-substituted pyridine according to the above paragraph (1) wherein R represents an alkyl group or an alkoxy group each of 1 to 10 carbon atoms; Y represents F, Cl or H; and Z represents an alkyl group of 1 to 10 carbon atoms, in said formula (I).

(5) A 2-(β-substituted ethyl)-5-substituted pyridine according to the above paragraph (1) wherein R represents an alkyl group or an alkoxy group each of 1 to 10 carbon atoms; Y represents F, Cl or H; and Z represents an alkoxy group of 1 to 10 carbon atoms, in said formula (I).

The present invention in a second aspect resides in a liquid crystal composition having at least two components at least one of which is a liquid crystal compound expressed by the formula (I) as set forth in the above paragraph (I).

DETAILED DESCRIPTION OF PREFERRED EMBODIMENTS

The compounds of the present invention expressed by the formula (I) may be prepared according to a known method expressed by the following reaction scheme:

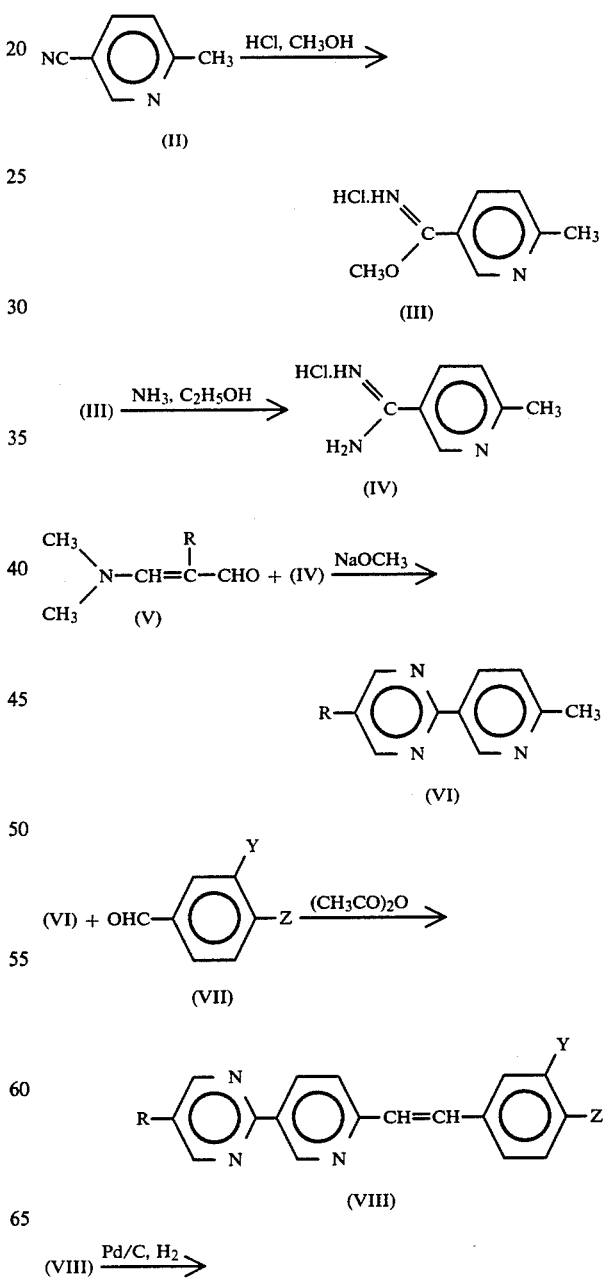

-continued

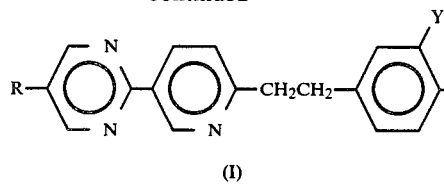

Namely, 3-cyano-6-methylpyridine (II) is reacted with hydrogen chloride in the presence of an alcohol solvent to obtain an imide ether hydrochloride derivative (III), followed by reacting this compound (III) with ammonia in an alcohol solvent to obtain an amidine hydrochloride derivative (IV), thereafter subjecting this compound (IV) and an acrolein derivative having a suitable substituent R (V) to condensation-cyclization reaction in the presence of a suitable basic catalyst such as an alkali alcoholate or pyridine and triethylamine, etc. to obtain a pyrimidylpyridine derivative (VI), subjecting this compound (VI) and a substituted benzaldehyde (VII) to dehydration-condensation reaction in the presence of acetic anhydride to obtain a 2-[β-(substituted phenyl)vinyl]-5-(5'-substituted pyrimidinyl-2')pyridine (VIII), and reducing this compound (VIII) to obtain the objective a 2-[β-(substituted phenyl)ethyl]-5-(5'-substituted pyrimidinyl-2')pyridine (I).

As concrete examples of other liquid crystal compounds constituting liquid crystal compositions together with the compound of the formula (I), a group of known compounds expressed by the following formulas (i)–(xxxiii) may be enumerated wherein X represents

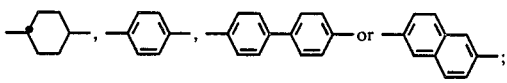

W represents —CN, halogen, R" or OR"; and R' and R" each represent an alkyl group:

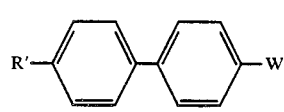 (i)

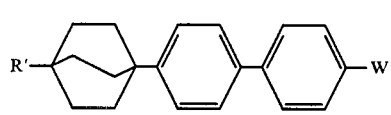 (xviii)

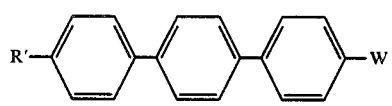 (ii)

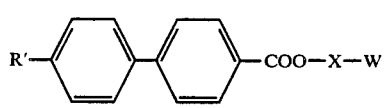 (xix)

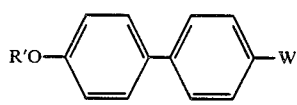 (iii)

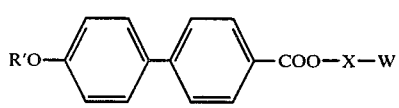 (xx)

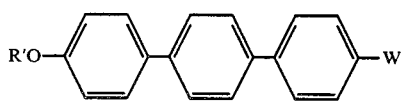 (iv)

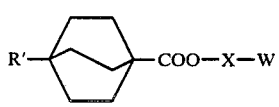 (xxi)

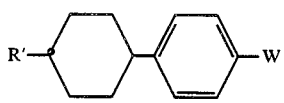 (v)

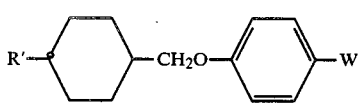 (xxii)

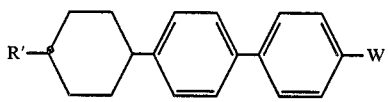 (vi)

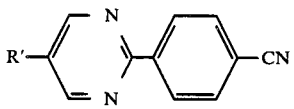 (xxiii)

 (vii)

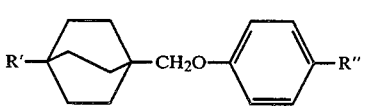 (xxiv)

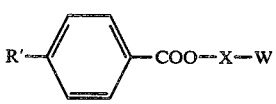 (viii)

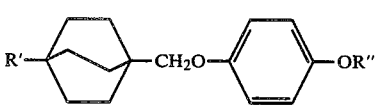 (xxv)

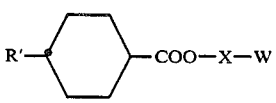 (ix)

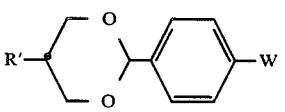 (xxvi)

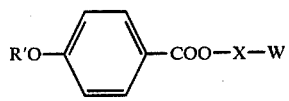 (x)

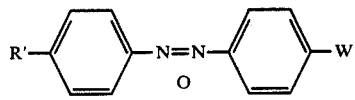 (xi)

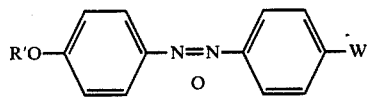 (xii)

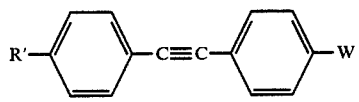 (xiii)

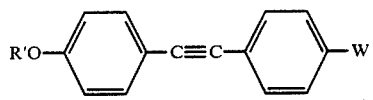 (xiv)

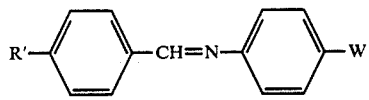 (xv)

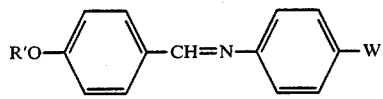 (xvi)

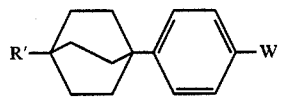 (xvii)

-continued

 (xxvii)

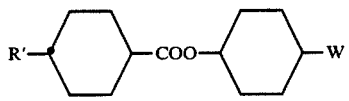 (xxviii)

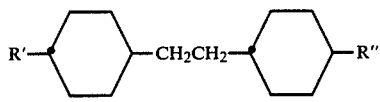 (xxix)

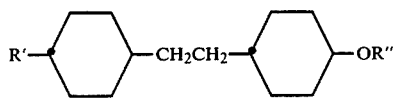 (xxx)

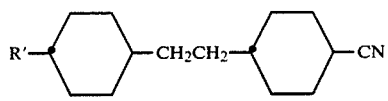 (xxxi)

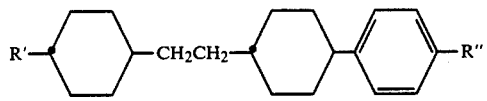 (xxxii)

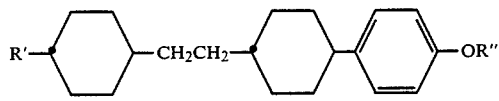 (xxxiii)

The content of the compound of the present invention in the composition of the present invention varies depending on the kind of other components to be blended therewith. It is usually in the range of 1 to 30% by weight, preferably 5 to 15% by weight. A concrete example of composition is as follows:

one kind or mixtures of several kinds of trans-4-alkyl-(4-cyanophenyl)cyclohexanes (70 to 99% by weight, preferably 85 to 95% by weight) and the novel liquid crystal compound of the present invention (1 to 30% by weight, preferably 5 to 15% by weight).

Another example of composition is as follows:

one kind or mixtures of several kinds of trans-4-alkyl-(4-cyanophenyl)cyclohexanes (60 to 84% by weight, preferably 72 to 81% by weight), one kind or mixtures of several kinds of 4-(trans-4-alkylcyclohexyl)-4'-cyanobiphenyls (10 to 15% by weight, preferably 12 to 15% by weight) and the novel liquid crystal compound of the present invention (1 to 30% by weight, preferably 5 to 15% by weight).

A prior art which the present inventors consider as most relevant to the present invention is EP 97033A. One of the claims of this European Patent discloses the compounds expressed by

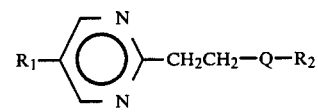

(wherein $R_1$ represents an alkyl group; $R_2$ represents F, cyano group or an alkyl group or an alkoxy group; Q represents 1,4-disubstituted benzene containing F, Cl or methyl group).

The compound of the present invention has much superior properties in that it has a relatively low viscosity and nevertheless has a large dielectric anisotropy value (hereinafter abbreviatd to $\Delta\epsilon$) and optical anisotropy value (hereinafter abbreviated to $\Delta n$), and yet, when added to a liquid crystal composition, raises the clearing point of the composition, as shown in Table 1. As to the improvement in these characteristics, it is evident that the nitrogen atoms of the pyrimidine ring and the pyridine ring constituting the compound of the present invention are contributing to increase in $\Delta\epsilon$ and $\Delta n$.

TABLE 1

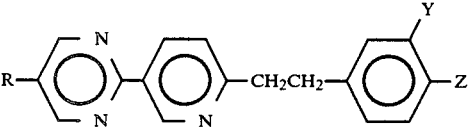

| | | | Values in case where compound of formula (I) is added in 15% by weight to composition (A) | | | |
|---|---|---|---|---|---|---|
| R | Y | Z | Clearing point (°C.) | Δε | Δn | η₂₀ (cp) |
| C₅H₁₁ | H | F | 55.4 | 13.7 | 0.127 | 24.7 |
| C₅H₁₁ | H | CN | 65.5 | 16.6 | 0.142 | 28.0 |
| C₃H₇ | F | F | 53.0 | 13.8 | 0.127 | 25.4 |
| C₃H₇ | H | C₂H₅ | 57.0 | 11.7 | 0.128 | 23.5 |
| C₃H₇ | H | OCH₃ | 62.6 | 12.2 | 0.137 | 24.1 |
| Composition (A) | | | 52.1 | 11.2 | 0.119 | 23.4 |

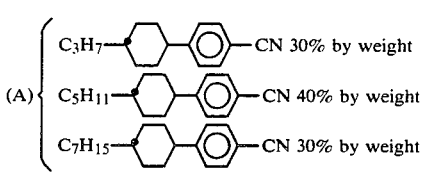

In the Table, η₂₀(cp) means a viscosity at 20° C.
In the case of a compound expressed by the formula

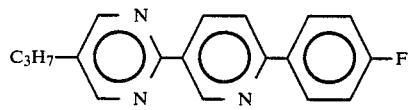

(crystalline-nematic point: 141° C., nematic-clearing point: 184° C.) having a covalent bond in place of a bond of ethylene group, when it is added in a quantity of 10% by weight or more to the composition (A), the resulting composition crystallizes at room temperature, whereas even when the compound of the present invention expressed by the formula (I)

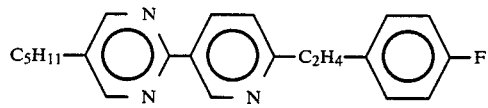

is added in a quantity of 15% by weight to the composition (A), the resulting composition does not crystallize. Thus, it is evident that the presence of an ethylene bond in the molecule improves the compatibility of the compound with other compounds in a liquid crystal composition.

As described above, the compound of the present invention is superior in compatibility with other liquid crystal compounds or liquid crystal compositions; it is chemically stable; and when added to liquid crystal compositions, it can raise the clearing point of the compositions almost without increasing their viscosity and enhance their Δε and Δn.

The present invention will be described in more detail by way of Examples, but it should not be construed to be limited thereto.

EXAMPLE 1

Preparation of 2-[β-(4-fluorophenyl)ethyl]-5-(5'-pentylpyrimidinyl-2')pyridine

Into a solution of sodium methylate (12.6 g) dissolved in anhydrous methanol (150 ml) were added 6-methyl-3-pyridylcarboxamidine hydrochloride (20 g) corresponding to the formula (IV) and α-pentyl-β-dimethylaminoacrolein (20 g) corresponding to the formula (V), followed by heating the mixture under reflux with stirring for 2 hours, distilling off methyl alcohol, adding toluene (200 ml) to the reaction residue to extract the product, washing the liquid extract with water, drying over anhydrous sodium sulfate, distilling off toluene, and three times repeating recrystallization from methanol to obtain 2-methyl-5-(5'-pentylpyrimidinyl-2')pyridine (m.p. 75.3°–75.8° C.) (15.6 g) corresponding to the formula (VI).

This compound (7.2 g) and 4-fluorobenzaldehyde (3.7 g) corresponding to the formula (VII) were heated under reflux in the coexistence of acetic anhydride (4 ml) for 30 hours, cooling the reaction fluid, and washing the resulting solid product with methanol to obtain 2-[β-(4-fluorophenyl)vinyl]-5-(5'-pentylpyrimidinyl-2')-pyridine (6.0 g) corresponding to the formula (VIII), dissolving this compound (6.0 g) corresponding to the formula (VIII) in toluene (200 ml), adding palladium-carbon (1.0 g), carrying out catalytic reduction at normal temperature and normal pressure for 2 hours, filtering off the catalyst from the reaction fluid, distilling off toluene and recrystallizing the remaining solids from ethanol to obtain the objective 2-[β-(4-fluorophenyl)ethyl]-5-(5'-pentylpyrimidinyl-2')pyridine (4.7 g), which had the following phase transition points:

Crystalline-nematic point (C-N point) 90.8°–91.4° C.
Smectic-nematic point (S-N point) (80.1°–80.3° C.)
Nematic-clearing point (N-I point) 100.1°–100.5° C.

The above numerical values in the parenthese indicate that the phase is monotropic.

The following liquid crystal compounds corresponding to the formula (I) were obtained using the following compounds corresponding to the formulas (VI) and (VII) in the same manner as in Example 1:

EXAMPLE 2

(VI): 2-methyl-5-(5'-propylpyrimidinyl-2')pyridine
(VII): 4-ethylbenzaldehyde
(I): 2-[β-(4-ethylphenyl)ethyl]-5-(5'-propylpyrimidinyl-2')pyridine
C-N point 68.5°–69.5° C.
N-I point 101.3°–101.5° C.

EXAMPLE 3

(VI): 2-methyl-5-(5'-pentylpyrimidinyl-2')pyridine
(VII): 4-cyanobenzaldehyde
(I): 2-[β-(4-cyanophenyl)ethyl]-5-(5'-pentylpyrimidinyl-2')pyridine
C-S point 101.8°–102.6° C.
S-N point 113.3°–113.5° C.
N-I point 161.1°–161.5° C.

EXAMPLE 4

(VI): 2-methyl-5-(5'-propylpyrimidinyl-2')pyridine
(VII): 4-anisaldehyde
(I): 2-[β-(4-methoxyphenyl)ethyl]-5-(5'-propylpyrimidinyl-2')pyridine
C-N point 76.2°–77.0° C.
N-I point 125.6°–125.9° C.

EXAMPLE 5

(VI): 2-methyl-5-(5'-propylpyrimidinyl-2')pyridine
(VII): 3,4-difluorobenzaldehyde
(I): 2-[β-(3,4-difluorophenyl)ethyl]-5-(5'-propyl-pyrimidinyl-2')pyridine
C-N point 75.1°–76.0° C.
S-N point (59.2°–60.0° C.)
N-I point 81.5°–82.3° C.

EXAMPLE 6

A liquid crystal composition (A) consisting of

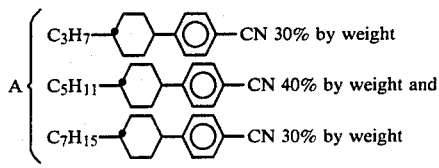

has a N-I point of 52.1° C., a viscosity at 20° C. of 23.4 cp, a dielectric anisotropy value (Δε) of 11.2 and an optical anisotropy value (Δn) of 0.119. This liquid crystal composition (A) was sealed in a TN cell of 10 μm thick provided with opposed, transparent electrodes. The resulting liquid crystal cell had a threshold voltage driven at 20° C. of 1.54 V and a saturation voltage of 2.13 V.

A liquid crystal composition (B) consisting of the above liquid crystal composition (A) (85% by weight) and 2-[β-(4-fluorophenyl)ethyl]-5-(5'-pentylpyrimidinyl-2')-pyridine (15% by weight) had a N-I point of 55.4° C., a viscosity at 20° C. of 24.7 cp, a Δε of +13.7 and a Δn of 0.127. When this composition (B) was sealed in the above T-N cell, the resulting liquid crystal cell had a driven threshold voltage of 1.48 V and a saturation voltage of 2.12 V.

What we claim is:

1. A novel liquid crystal compound expressed by the formula (I)

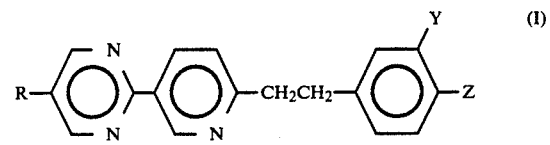

wherein R represents an alkyl group or an alkoxy group each of 1 to 10 carbon atoms; Y represents F, Cl or H; and Z represents F, Cl, cyano group or an alkyl group or an alkoxy group each of 1 to 10 carbon atoms.

2. A 2-(β-substituted ethyl)-5-substituted pyridine according to claim 1 wherein R represents an alkyl group or an alkoxy group each of 1 to 10 carbon atoms; Y represents H; and Z represents F, Cl or cyano group.

3. A 2-(β-substituted ethyl)-5-substituted pyridine according to claim 1 wherein R represents an alkyl group or an alkoxy group each of 1 to 10 carbon atoms; Y represents F or Cl; and Z represents F, Cl or cyano group.

4. A 2-(β-substituted ethyl)-5-substituted pyridine according to claim 1 wherein R represents an alkyl group or an alkoxy group each of 1 to 10 carbon atoms; Y represent F, Cl or H; and Z represents an alkyl group of 1 to 10 carbon atoms.

5. A 2-(β-substituted ethyl)-5-substituted pyrimidine according to claim 1 wherein R represents an alkyl group or an alkoxy group each of 1 to 10 carbon atoms; Y represent F, Cl or H; and Z represents an alkoxy group of 1 to 10 carbon atoms.

6. A liquid crystal composition having at least two components at least one of which is a liquid crystal compound expressed by the formula (I) as set forth in claim 1.

* * * * *